(12) United States Patent
Honsel

(10) Patent No.: US 10,112,232 B2
(45) Date of Patent: Oct. 30, 2018

(54) RIVETING DEVICE

(71) Applicant: VVG-BEFESTIGUNGSTECHNIK GMBH & CO. KG, Neumuenster (DE)

(72) Inventor: Michael H. Honsel, Esgrus (DE)

(73) Assignee: VVG-BEFESTIGUNGSTECHNIK GMBH & CO. KG, Neumuenster (DE)

( * ) Notice: Subject to any disclaimer, the term of this patent is extended or adjusted under 35 U.S.C. 154(b) by 381 days.

(21) Appl. No.: 14/895,210

(22) PCT Filed: May 27, 2014

(86) PCT No.: PCT/EP2014/060955
§ 371 (c)(1),
(2) Date: Dec. 2, 2015

(87) PCT Pub. No.: WO2014/195189
PCT Pub. Date: Dec. 11, 2014

(65) Prior Publication Data
US 2016/0114383 A1 Apr. 28, 2016

(30) Foreign Application Priority Data
Jun. 4, 2013 (DE) .................. 10 2013 105 703

(51) Int. Cl.
*B21J 15/26* (2006.01)
*B21J 15/02* (2006.01)
*B25B 27/00* (2006.01)

(52) U.S. Cl.
CPC .............. *B21J 15/26* (2013.01); *B21J 15/02* (2013.01); *B25B 27/0014* (2013.01);
(Continued)

(58) Field of Classification Search
CPC ....... B21J 15/02; B21J 15/26; B25B 27/0014; Y10T 29/49945; Y10T 29/49947;
(Continued)

(56) References Cited

U.S. PATENT DOCUMENTS 5,375,309 A 12/1994 Dunn
5,605,070 A 2/1997 Wille
(Continued)

FOREIGN PATENT DOCUMENTS

CN 1741868 A 3/2006
CN 2875652 Y 3/2007
(Continued)

*Primary Examiner* — Bayan Salone
(74) *Attorney, Agent, or Firm* — Norman B. Thot

(57) ABSTRACT

A riveting device for setting a blind rivet element includes a mandrel, a first motor comprising a first operative connection to the mandrel, and a second motor comprising a second operative connection to the mandrel. The mandrel is configured to have a rotational movement be transmitted thereto to screw the mandrel into the blind rivet element, and to be retracted into the riveting device by a retraction movement to produce an at least partial plastic deformation of the blind rivet element. The first motor transmits the rotational movement to the mandrel via the first operative connection. The second motor transmits the retraction movement to the mandrel via the second operative connection.

14 Claims, 1 Drawing Sheet

(52) U.S. Cl.
CPC .... *Y10T 29/49945* (2015.01); *Y10T 29/49947* (2015.01); *Y10T 29/49954* (2015.01); *Y10T 29/49956* (2015.01)

(58) Field of Classification Search
CPC ......... Y10T 29/49954; Y10T 29/49956; Y10T 29/49941; Y10T 29/49943; Y10T 29/53079; Y10T 29/53739; Y10T 29/53752; Y10T 29/5377; B23P 11/00; B23P 11/005
USPC ... 29/525.05–525.07, 525.01, 243.5, 243.53, 29/243.526, 243.523
See application file for complete search history.

(56) References Cited

U.S. PATENT DOCUMENTS

| | | | |
|---|---|---|---|
| 5,655,289 A | 8/1997 | Wille et al. | |
| 6,272,899 B1 * | 8/2001 | Bentivogli | B25B 27/0014 |
| | | | 29/243.525 |
| 8,307,525 B2 * | 11/2012 | Gregory | B21J 15/205 |
| | | | 29/243.521 |
| 9,233,129 B2 * | 1/2016 | Han | B01D 15/00 |
| 2004/0139590 A1 | 7/2004 | Eldessouky | |
| 2010/0125991 A1 | 5/2010 | Preti | |
| 2010/0257713 A1 | 10/2010 | Gregory | |
| 2011/0271504 A1 * | 11/2011 | Preti | B21J 15/20 |
| | | | 29/243.524 |

FOREIGN PATENT DOCUMENTS

| | | |
|---|---|---|
| CN | 1950159 A | 4/2007 |
| CN | 101856715 A | 10/2010 |
| CN | 202427885 U | 9/2012 |
| DE | 43 39 117 A1 | 5/1995 |
| DE | 44 28 678 A1 | 2/1996 |
| EP | 0 670 199 A1 | 9/1995 |
| EP | 1 402 974 A2 | 3/2004 |
| EP | 2 093 024 A1 | 8/2009 |
| WO | WO 2008/132576 A2 | 11/2008 |
| WO | WO 2009/103695 A1 | 8/2009 |

\* cited by examiner

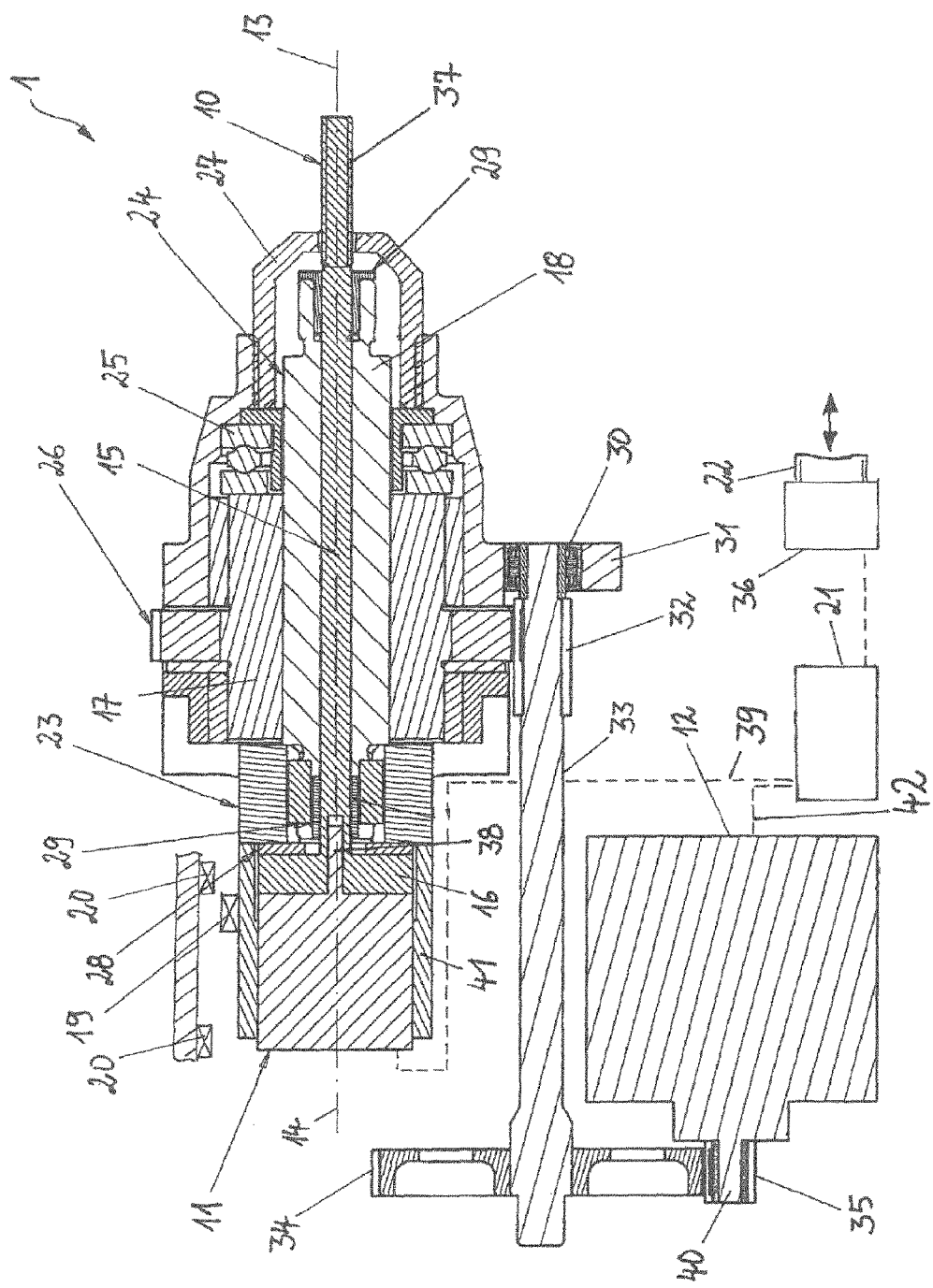

RIVETING DEVICE

CROSS REFERENCE TO PRIOR APPLICATIONS

This application is a U.S. National Phase application under 35 U.S.C. § 371 of International Application No. PCT/EP2014/060955, filed on May 27, 2014 and which claims benefit to German Patent Application No. 10 2013 105 703.9, filed on Jun. 4, 2013. The International Application was published in German on Dec. 11, 2014 as WO 2014/195189 A1 under PCT Article 21(2).

FIELD

The present invention relates to a riveting device and to a method for operating a riveting device for setting blind rivet elements, namely, blind rivet nuts and/or blind rivet screws, wherein the device features a mandrel, to which a rotational movement can be transmitted in order to screw the mandrel into the blind rivet element, and wherein the mandrel can be retracted into the riveting device via a retraction movement to produce an at least partial plastic deformation of the blind rivet element.

BACKGROUND

EP 0 670 199 A1 describes a riveting device for setting blind rivet elements that features a mandrel, wherein the mandrel can be set in rotation in order to screw the blind rivet element on the mandrel. The mandrel is subjected to the rotational movement by a motor, wherein the mandrel is set in rotation until it has carried out a certain number of revolutions, and wherein the number of revolutions is chosen so that the blind rivet element can be securely screwed on the mandrel.

Once the blind rivet element reaches the mouthpiece on the front side of the housing of the riveting device, further rotation of the mandrel is no longer possible and the blind rivet element exerts a load moment upon the mandrel. The generated load moment causes the disengagement of a clutch so that any further transmission of a rotational movement to the mandrel is interrupted. The same motor subsequently generates a retraction movement of the mandrel into the riveting device in order to ultimately produce the plastic deformation in the blind rivet element. The retraction of the mandrel takes place until a drive component reaches a limit switch, the actuation of which causes a reversal of the motor so that the mandrel can be screwed out of the elastically deformed blind rivet element.

The transmission of the rotational movement to the mandrel and the subsequent retraction of the mandrel into the riveting device with only a single motor requires complex gearing because the change-over between the rotational movement and the retraction movement must take place mechanically. Particularly the friction clutch used, which features an engaging and disengaging component, has an elaborate design.

In addition to the elaborate constructive design of the gearing in the riveting device, it is also disadvantageous that the clutch of the threaded spindle only makes it possible to transmit a fixed speed for screwing blind rivet elements on and off the mandrel via the gearing. It would be advantageous in this respect to also allow different speeds of the rotational movement of the mandrel for different thread sizes of blind rivet elements. It may be advantageous, for example, to preselect a very slow speed for screwing the mandrel into the blind rivet element over the first few turns, and to subsequently increase the speed once the thread on the mandrel securely engages into the thread in the blind rivet element in order to quickly screw the blind rivet element on the mandrel. This would lead to an optimized and shortened work cycle during the operation of the riveting device.

Another disadvantage is that the activation of the provided friction clutch requires energy, which is particularly disadvantageous with respect to battery-operated riveting devices because such riveting devices should be able to set as many blind rivet elements as possible with only one battery charge. Yet another disadvantage is that it is not possible to use the full force of the motor for setting the blind rivet elements because a portion of this force is consumed by the clutch. The clutch is also subject to wear so that the clutch may, if applicable, have to be replaced several times over the service life of the riveting device.

It is furthermore disadvantageous that the riveting device is stroke-controlled so that the same path must be traveled for retracting the mandrel into the riveting device during each setting process. Manufacturing tolerances of the blind rivet elements and of the material to be riveted cannot be taken into consideration and may lead to overloading of the thread in the blind rivet element, for example, when aluminum blind rivet elements are used. Another disadvantage is that a portion of the revolutions of the ball screw spindle of the gearing is required to screw the blind rivet element on and off. The gearing must therefore be designed longer and becomes altogether heavier, wherein this is generally undesirable with respect to handheld riveting devices. The riveting device can also only set blind rivet elements with a right-hand or a left-hand thread. A user who wants to set different blind rivet elements with a left-hand thread and a right-hand thread therefore requires an additional riveting device.

SUMMARY

An aspect of the present invention is to enhance a riveting device for setting blind rivet elements to eliminate the above-described disadvantages of the prior art. An aspect of the present invention is to provide a riveting device with a simpler mechanical design, as well as to control and adapt the rotational movement of the mandrel to different blind rivet elements independently of a retraction movement of the mandrel.

In an embodiment, the present invention provides a riveting device for setting a blind rivet element which includes a mandrel, a first motor comprising a first operative connection to the mandrel, and a second motor comprising a second operative connection to the mandrel. The mandrel is configured to have a rotational movement be transmitted thereto to screw the mandrel into the blind rivet element, and to be retracted into the riveting device by a retraction movement to produce an at least partial plastic deformation of the blind rivet element. The first motor is configured to transmit the rotational movement to the mandrel via the first operative connection. The second motor is configured to transmit the retraction movement to the mandrel via the second operative connection.

BRIEF DESCRIPTION OF THE DRAWING

The present invention is described in greater detail below on the basis of embodiments and of the drawing in which:

FIG. 1 shows a cross section through a riveting device with the characteristics of the present invention.

DETAILED DESCRIPTION

In an embodiment, the present invention provides that a riveting device for setting blind rivet elements features a first motor, via which the rotational movement can be transmitted to the mandrel via a first operative connection to the mandrel, and that the riveting device features a second motor, via which the retraction movement can be transmitted to the mandrel via a second operative connection to the mandrel.

The present invention is based on the idea of equipping a riveting device for setting blind rivet elements with two motors, wherein a first motor serves exclusively to generate the rotational movement of the mandrel, and wherein a second motor serves exclusively to generate the retraction movement of the mandrel and can be operated independently of the first motor. Both motors may be operatively connected to the mandrel independently of one another, but it would presently also be conceivable that both operative connections comprise common components.

The inventive design of the riveting device eliminates the above-described disadvantages, in particular, because the first motor can be operated independently of the second motor. The two operative connections between motor and mandrel, which are essentially realized independently of one another, can together be realized in a simpler fashion than a single operative connection between a single motor and a mandrel, in which elaborate mechanical devices, such as a friction clutch and the like, are required for initially transmitting the rotational movement and subsequently the retraction movement to the mandrel. The utilization of two motors in particular eliminates the mechanical coupling between the motor and the mandrel for terminating the rotational movement and initiating the retraction movement so that, according to the present invention, the actuation of the mandrel must no longer be stroke-controlled, but the control of the motors may rather be realized, for example, in a force-controlled fashion, particularly by detecting the operating parameters of the motors.

In an embodiment of the present invention, the mandrel can, for example, be respectively rotatable about a mandrel axis or axially movable along this mandrel axis, wherein the first motor may be arranged so that the motor axis of the first motor coincides with the mandrel axis. The first motor may therefore be positioned behind the mandrel axis. It would also be possible to provide a mandrel shaft that extends along the mandrel axis and produces the operative connection between the first motor and the mandrel. In this case, the first motor may comprise a gear unit or a separate gear unit may be provided between the first motor and the mandrel shaft.

The first motor may have a lower electrical input power and/or a lower mechanical output power than the second motor, wherein it would be possible, for example, to use subfractional horsepower motors with integrated gear unit as the first motor. Only a low motor power is required because the mandrel must merely be set in rotation in order to screw the blind rivet element on the mandrel. Significantly higher electromechanical power, which can be generated by the second motor, is, however, required for subsequently realizing the plastic deformation in the blind rivet element. In comparison with a single motor and the mandrel, the resulting simplified gearing technology in the operative connections between the motors and the mandrel makes it possible to realize a riveting device with significantly lower weight despite the utilization of a second motor.

In an embodiment of the present invention, the first motor can, for example, be operated as a right-hand or as a left-hand motor, for example, due to a simple electric pole reversal. If the mandrel is accordingly realized with a right-hand thread or a left-hand thread, the riveting device can be easily used to set blind rivet elements that feature a right-hand thread or a left-hand thread.

The operative connection between the second motor and the mandrel may comprise a spindle nut that cooperates with a hollow spindle, wherein the mandrel shaft can be lifted with the hollow spindle. In this way, the mandrel shaft and therefore the mandrel carries out any axial movement generated by the hollow spindle so that the hollow spindle, the mandrel shaft, and therefore the mandrel, can be jointly moved. The mandrel may in particular be rigidly connected to the hollow spindle in the axial direction via the mandrel shaft so that the mandrel can be axially moved back and forward by the second motor via the spindle nut and the hollow spindle without the intermediate arrangement, for example, of a drive component.

In an embodiment of the present invention, the mandrel shaft, which respectively connects the first motor or the gear unit of the first motor to the mandrel, can extend concentrically through the hollow spindle and be rotatably supported therein. When the hollow spindle is axially displaced due to the rotation of the spindle nut, the mandrel shaft with the mandrel and furthermore also the first motor, if applicable, with the gear unit are also displaced together with the hollow spindle. For example, plain bearing bushes may be provided to support the mandrel shaft in the hollow spindle. The mandrel shaft and the mandrel particularly may also be realized in one piece, or the mandrel can, for example, be attached to the mandrel axis by a corresponding fastener in order to allow a required exchange.

A pinion gear, which meshes with a gear rim on the outside of the spindle nut, may serve to drive the spindle nut that may be accommodated in the housing of the riveting device in an axially immovable fashion, wherein the pinion gear may be accommodated on an intermediate shaft that can be driven by the second motor via an additional gear pair. The spindle nut with the gear rim may be rotatably accommodated in the housing of the riveting device, wherein a rotational lock and a corresponding housing may furthermore be provided for the first motor that is arranged on the hollow spindle on the rear side and cannot rotate together with the hollow spindle. The housing of the motor may, for example, be connected to the housing of the riveting device in a rotationally secured fashion.

In an embodiment of the riveting device of the present invention, at least one sensor may, for example, be provided for at least determining the axial position of the hollow spindle or the mandrel shaft. It would in particular be possible to provide a control unit via which the first motor and/or the second motor can be activated, particularly in interaction with the sensor. An operator can control the motors with the aid of an actuating element, wherein the actuating element consists, for example, of a control pushbutton. The operator can thereby control the rotational speed of the first and/or the second motor by pressing the actuating element into the control pushbutton to different depths, particularly to screw a blind rivet element on the mandrel by activating the first motor. The operator can also control the second motor, for example, in order to interrupt the initiation of a plastic deformation in the blind rivet element for other reasons. The control pushbutton may in particular also feature a change-over switch in order to once again screw the mandrel out of the blind rivet element without completing the retraction movement and the plastic deformation of the blind rivet element.

In an embodiment, the present invention also provides a method for operating a riveting device for setting blind rivet elements, namely, blind rivet nuts and/or blind rivet screws, wherein the riveting device features a mandrel, to which a rotational movement is transmitted in order to screw the mandrel into the blind rivet element and to which a retraction movement is transmitted in order to produce an at least partial plastic deformation of the blind rivet element, wherein the method features at least the step of activating a first motor, via which the rotational movement is transmitted to the mandrel via a first operative connection to the mandrel, in order to screw the mandrel into the blind rivet element, and wherein the aforementioned step is followed by the step of deactivating the first motor, as well as the step of activating a second motor, via which the retraction movement is transmitted to the mandrel via a second operative connection to the mandrel in order to produce the at least partial plastic deformation in the blind rivet element. The poles of the second motor can subsequently be reversed in order to once again screw the mandrel out of the deformed blind rivet element.

The method may be managed by a control unit for controlling the motors and the electric current and/or the electric voltage for operating the first and/or the second motor can be detected by the control unit, wherein the activation and/or the deactivation of the first and/or the second motor is controlled by the control unit in dependence on the detected electric current and/or the electric voltage. It would be possible, for example, to define a limiting current that is reached when the required plastic deformation in the blind rivet element has been produced. Once the limiting current is detected by the control unit, the poles of the second motor can be reversed in order to once again screw the mandrel out of the completely set blind rivet element. In this way, the riveting device can simply be operated by detecting electrical parameters of the motors and no limit switches or other position detection means are required in the operative connections between the motors and the mandrel.

Threshold values for the electric current and/or the electric voltage for operating the first and/or the second motor may furthermore be predefined, wherein these threshold values may be stored in the control unit, in particular, in dependence on the blind rivet elements used. Different blind rivet elements with different sizes, which may also consist of different materials, may require different retraction paths of the mandrel that are respectively reached earlier or later and can be detected based on the operating current and/or the operating voltage of the motors only. This makes it possible to, in particular, compensate tolerances of the blind rivet elements, as well as of the materials to be riveted, because the motors are exclusively controlled based on the electric operating parameters and the mandrel is not retracted into the riveting device by a fixed path such that the blind rivet element or even the mandrel could be destroyed.

An actuating element may additionally be provided for a manual actuation by the operator, wherein the actuating element can be actuated in a path-dependent fashion so that at least the first motor is activated with a variable speed over the manually controllable path of the actuation. The actuating element may, for example, comprise a potentiometer, via which the speed of the first motor and, for example, also the second motor can be controlled.

The principle of controlling the motors via electric operating parameters may be based on defining threshold values that should not be fallen short of or exceeded. For example, if the current increases above a certain threshold value, the riveting device can shut down in order to prevent damage to the motor and the control unit. In this case, the riveting device once again returns into an initial position and the blind rivet element can be released, in particular, in the initial position. If the battery of a battery-operated riveting device approaches its capacity limit and the voltage decreases, the voltage drops below a threshold value so that it is possible to detect that the battery is empty. In this case, the riveting device may also once again return into the initial position and release the blind rivet element, wherein the device can only be used again after a battery change that can also be detected by the control unit.

In addition to a control pushbutton with an actuating element that can be depressed in a path-dependent fashion, for example, in order to control the speeds of motors, a control panel may also be arranged on the riveting device for the operation thereof and controlled with buttons or a touchscreen. It would also be conceivable to establish a wireless Bluetooth or Wi-Fi or cable connection with a computer or smart phone that is able to run a suitable software or application. An emergency switch may furthermore be arranged on the riveting device.

The parameters that can be stored in the riveting device and, in particular, in the control unit may concern different characteristics. The thread size of the blind rivet elements may, for example, be input in order to assign a maximum screw-on speed that is stored in the memory of the riveting device or software on a separate device. It is also possible to directly input the screw-on speed, and the corresponding value may be stored for a certain blind rivet element. Blind rivet elements that consist of different materials, have different types of threads, or different geometric dimensions, can analogously be input into the control. The operator can in this case select the blind rivet element to be processed on a display of the control unit and the control unit controls the motors so that the currently used blind rivet element can be set with optimal parameters.

Other measures that enhance the present invention are described in greater detail below in connection with the description of an embodiment of the invention with reference to FIG. 1.

FIG. 1 shows a cross-sectional view of a riveting device 1 with the characteristics of the present invention. The riveting device 1 features a basic structure in the form of a housing 31 that is only partially illustrated. The riveting device 1 serves to set blind rivet elements that can be accommodated on a mandrel 10; the blind rivet elements may be used, for example, to connect components. The mandrel 10 is realized with a thread 37 that can be screwed into a threaded bore in the blind rivet element. The mandrel 10 is accommodated on the end of a mandrel shaft 15, wherein the connection or the transition between the mandrel 10 and the mandrel shaft 15 is only schematically illustrated. The mandrel 10 and the mandrel shaft 15 may be realized in one piece, or the mandrel 10 may be accommodated on the end of the mandrel shaft 15 via a corresponding connection.

The mandrel shaft 15 extends concentrically around a mandrel axis 13, along which the mandrel 10 also extends. The side of the mandrel shaft 15 facing away from the mandrel 10 is connected to a first motor 11 that serves to rotationally drive the mandrel shaft 15, and therefore the mandrel 10, about the mandrel axis 13. The first motor 11 extends along a motor axis 14 that coincides with the mandrel axis 13. The first motor 11 is connected to a gear unit 16, via which the rotational speed of the motor shaft 38 of the first motor 11 can be reduced to the rotational speed of the mandrel shaft 15.

When the first motor 11 is activated, the mandrel shaft 15 and therefore the mandrel 10 can be set in rotation via the gear unit 16 in order to screw a blind rivet element on the thread 37 of the mandrel 10. For example, the blind rivet element may be screwed on the thread 37 until the blind rivet element contacts the outer end face of a mouthpiece 27 that is inserted into the housing 31 on the front side of the riveting device 1.

The riveting device 1 is equipped with a control unit 21, via which the first motor 11 can be controlled via a control line 39. When the blind rivet element contacts the outside of the mouthpiece 27, the further rotation of the mandrel 10, and therefore the rotation of the mandrel shaft 15, are blocked so that the input current of the first motor 11 surges. The increase of the input current can be detected by the control unit 21 so that the first motor 11 can be deactivated by an operator despite the actuation of an actuating element 22 of a control pushbutton 36. An overload of the first motor 11 is thereby prevented.

The riveting device 1 features a second motor 12 that has a higher electrical input power and a higher mechanical output power than the first motor 11. A pinion gear 35 is accommodated on the motor shaft 40 of the second motor 12 and drives a gear 34 that is accommodated on an intermediate shaft 33 in a torque-proof fashion. The gear stage with the pinion gear 35 and the gear 34 serves as a step-down gear so that the intermediate shaft 33 has a slower speed than the motor shaft 40.

The intermediate shaft 33 is rotatably supported in the housing 31 of the riveting device 1, wherein one exemplary bearing 30 used for this purpose is illustrated in FIG. 1. Another pinion gear 32 is arranged on the intermediate shaft 33 in a torque-proof fashion adjacent to the bearing 30 and meshes with a gear rim 26, wherein a spindle nut 17, on which the gear rim 26 is arranged, can be set in rotation due to the rotation of the pinion gear 32. A hollow spindle 18 extends through the spindle nut 17, wherein the connection of the spindle nut 17 to the hollow spindle 18 comprises a (not-illustrated) spindle thread 24, into which the spindle nut 17 engages. The rotation of the spindle nut 17 consequently generates an axial movement of the hollow spindle 18 so that the hollow spindle 18 can be displaced along the mandrel axis 13 when the spindle nut 17 is set in rotation about the mandrel axis 13 due to the operation of the second motor 12.

The mandrel shaft 15 is rotationally supported in the hollow spindle 18 via plain bearings 29 and an axial bearing 28 is provided to accommodate the mandrel shaft 15 in the hollow spindle 18 so that it is immovable in the axial direction, wherein the axial bearing 28 is arranged between the first motor 11 or between the gear unit 16 and a rotational lock 23, and wherein the rotational lock 23 prevents the motor housing 41, in which the first motor 11 is accommodated, from also rotating.

When the hollow spindle 18 is displaced along the mandrel axis 13 due to the operation of the second motor 12, for example, so that the mandrel 10 is retracted into the mouthpiece 27 of the housing 31, the entire unit consisting of the first motor 11 and the gear unit 16 with the mandrel shaft 15 is displaced in the direction toward the motor axis 14. If a blind rivet element is screwed on the mandrel 10, a plastic deformation takes place in the blind rivet element due to the fact that a tensile force is introduced into the mandrel 10 via the mandrel shaft 15. The tensile force is generated between the spindle nut 17 and the hollow spindle 18, wherein the tensile force between the mandrel shaft 15 and the hollow spindle 18 is supported by the axial bearing 28. An axial bearing 25 is also located between the housing 31 of the riveting device 1 and the spindle nut 17 so that the tensile force exerted upon the spindle nut 17 by the hollow spindle 18 can be supported relative to the housing 31 by the axial bearing 25.

The second motor 12 is controlled by the control unit 21 via a second control line 42, wherein the input current of the second motor 12 also increases once the plastic deformation in the blind rivet element has reached a degree that leads to an excessive increase of the tensile force in the mandrel 10 or in the mandrel shaft 15, and wherein this increase of the input current is detected by the control unit 21. If the input current of the second motor 12 reaches a limiting value, the control unit 21 deactivates or reverses the poles of the second motor 12 even if an operator continues to actuate the actuating element 22 in order to once again screw the mandrel 10 out of the blind rivet element after the completion of its setting process.

In order to remove the mandrel 10 from the blind rivet element, it is initially necessary to release the tension between the blind rivet element and the mouthpiece 27 by slightly rotating the second motor 12 in the opposite direction and to subsequently again deactivate the first motor 12. Only then can the first motor 11 be activated in the opposite rotating direction in order to screw the mandrel 10 out of the blind rivet element.

The axial displacement of the hollow spindle 18 with the mandrel shaft 15 along the mandrel axis 13 and the axial displacement of the first motor 11 along the motor axis 14 can be detected with corresponding sensors 19 and 20. The sensors 19 may, for example, consist of a signal transmitter and the sensor 20 may comprise a signal pickup. For example, a signal transmitter 19 can move back and forward between two signal pickups 20 in that the signal transmitter 19 is arranged on the motor housing 41 of the first motor 11 that carries out the axial movement along the mandrel axis 13 together with the hollow spindle 18. The control unit 21 can detect the axial position of the mandrel 10 with the aid of the sensors 19 and 20, for example, in order to allow a reference run when the riveting device 1 is switched on or, for example, in order to once again return the riveting device 1 into an initial position when blind rivet elements are improperly set. The sensors 19 and 20 may, for example, comprise HALL sensors.

The control pushbutton 38 merely represents an exemplary actuating element 22 that can be pressed into the control pushbutton 36 in the direction of the arrow shown. The control pushbutton 36 may feature, for example, a potentiometer or a similarly acting electronic component that makes it possible to detect the depth, to which the actuating element 22 is depressed by the operator. This makes it possible, for example, to control the speed of the first motor 11 and/or the second motor 12, wherein the actuating element 22 may also be realized with two stages in order to activate the first motor 11 when the actuating element 22 is depressed to a first depth and to activate the second motor 12 when the actuating element 22 is pressed deeper into the control pushbutton 36 after overcoming a pressure threshold. This results in a simple, intuitively operated riveting device 14 for accommodating blind rivet elements on a mandrel 10 and subsequently setting the blind rivet element.

The design of the invention is not limited to the above-described preferred exemplary embodiment. In fact, it would be conceivable to realize numerous variations that also utilize the described solution in embodiments of a fundamentally different type. Reference should also be had to the appended claims.

LIST OF REFERENCE NUMERALS

1 Riveting device
10 Mandrel
11 First motor
12 Second motor
13 Mandrel axis
14 Motor axis
15 Mandrel shaft
16 Gear unit
17 Spindle nut
18 Hollow spindle
19 Sensor means, signal transmitter
20 Sensor means, signal pickup
21 Control unit
22 Actuating element
23 Rotational lock
24 Spindle thread
25 Axial bearing
26 Gear rim
27 Mouthpiece
28 Axial bearing
29 Plain bearing
30 Bearing
31 Housing
32 Pinion gear
33 Intermediate shaft
34 Gear
35 Pinion gear
36 Control pushbutton
37 Thread
38 Motor shaft
39 Control line
40 Motor shaft
41 Motor housing
42 Control line

What is claimed is:

1. A riveting device for setting a blind rivet element, the riving device comprising:
   a mandrel configured,
      to have a rotational movement be transmitted thereto to screw the mandrel into the blind rivet element, and
      to be retracted into the riveting device by a retraction movement to produce an at least partial plastic deformation of the blind rivet element;
   a first motor comprising a first operative connection to the mandrel, the first motor being configured to transmit the rotational movement to the mandrel via the first operative connection, the first operative connection between the first motor and the mandrel comprising a mandrel shaft which extends in a mandrel axis; and
   a second motor comprising a second operative connection to the mandrel, the second motor being configured to transmit the retraction movement to the mandrel via the second operative connection, the second operative connection between the second motor and the mandrel comprising a spindle nut which is configured to cooperate with a hollow spindle, whereby the hollow spindle is configured to lift the mandrel shaft.

2. The riveting device as recited in claim 1, wherein the first motor has at least one of a lower electrical input power and a lower mechanical output power than the second motor.

3. The riveting device as recited in claim 1, wherein,
   the mandrel is further configured to rotate about the mandrel axis or to axially move along the mandrel axis,
   the first motor comprises a motor axis, and
   the first motor is arranged so that the motor axis coincides with the mandrel axis.

4. The riveting device as recited in claim 1, wherein,
   the first motor comprises a gear unit, and
   the mandrel shaft is arranged on the gear unit.

5. The riveting device as recited in claim 1, wherein the mandrel shaft is configured to extend concentrically through the hollow spindle.

6. The riveting device as recited in claim 1, wherein the mandrel shaft is configured to be rotatably supported in the hollow spindle.

7. The riveting device as recited in claim 1, wherein the first motor and the gear unit are configured to be moved during a movement of at least one of the hollow spindle and the mandrel shaft.

8. The riveting device as recited in claim 1, further comprising at least one of:
   at least one sensor which is configured to detect an axial position of at least one of the hollow spindle and the mandrel shaft; and
   a control unit configured to activate at least one of the first motor and the second motor.

9. The riveting device as recited in claim 8, wherein the activation of the at least one of the first motor and the second motor by the control unit occurs via an interaction with the at least one sensor.

10. A method for operating a riveting device for setting a blind rivet element, wherein the riveting device comprises:
   a mandrel configured,
      to have a rotational movement be transmitted thereto to screw the mandrel into the blind rivet element, and
      to be retracted into the riveting device by a retraction movement to produce an at least partial plastic deformation of the blind rivet element;
   a first motor comprising a first operative connection to the mandrel, the first motor being configured to transmit the rotational movement to the mandrel via the first operative connection, the first operative connection between the first motor and the mandrel comprising a mandrel shaft which extends in a mandrel axis; and
   a second motor comprising a second operative connection to the mandrel, the second motor being configured to transmit the retraction movement to the mandrel via the second operative connection, the second operative connection between the second motor and the mandrel comprising a spindle nut which is configured to cooperate with a hollow spindle, whereby the hollow spindle is configured to lift the mandrel shaft,
   the method comprising:
      activating the first motor to transmit the rotational movement to the mandrel via the first operative connection to the mandrel so as to screw the mandrel into the blind rivet element;
      deactivating the first motor; and
      activating the second motor to transmit the retraction movement to the mandrel via the second operative connection to the mandrel so as to produce the at least partial plastic deformation of the blind rivet element.

11. The method as recited in claim 10, wherein the riveting device further comprises a control unit configured to activate at least one of the first motor and the second motor, the method further comprising:
  detecting with the control unit at least one of an electric current and an electric voltage for operating at least one of the first motor and the second motor, and
  controlling at least one of an activation and a deactivation of at least one of the first motor and the second motor with control unit based on the at least one of the electric current and the electric voltage detected.

12. The method as recited in claim 11, wherein the control unit comprises stored predefined threshold values for the at least one of the electric current and the electric voltage to operate the at least one of the first motor and the second motor.

13. The method as recited in claim 12, wherein the predefined threshold values are dependent on the blind rivet element used.

14. The method as recited in claim 10, wherein the riveting device further comprises an actuation element which is configured
  to be manually actuated by an operator, and
  to be actuated in a path-dependent manner so that, over a manually controllable path of the actuation, at least the first motor is activated with a variable rotational speed.

* * * * *